United States Patent [19]

Todd, Jr.

[11] Patent Number: 5,059,437

[45] Date of Patent: Oct. 22, 1991

[54] COLOR-STABILIZED PAPRIKA PIGMENT COMPOSITIONS AND FOODS COLORED THEREWITH HAVING INCREASED RESISTANCE TO OXIDATIVE COLOR FADING

[75] Inventor: Paul H. Todd, Jr., Kalamazoo, Mich.

[73] Assignee: Kalamazoo Holdings, Inc., Kalamazoo, Mich.

[21] Appl. No.: 525,340

[22] Filed: May 16, 1990

[51] Int. Cl.$^5$ .............................................. A23L 1/27
[52] U.S. Cl. ................................... 426/250; 426/540; 426/541; 426/650
[58] Field of Search ............... 426/250, 540, 541, 650, 426/651, 654

[56] References Cited

U.S. PATENT DOCUMENTS

| | | |
|---|---|---|
| 2,454,747 | 11/1948 | Weisblat et al. . |
| 2,454,748 | 11/1948 | Weisblat et al. . |
| 2,454,749 | 11/1948 | Wise . |
| 3,110,598 | 11/1963 | Müller et al. . |
| 3,316,101 | 4/1967 | Borenstein et al. ................. 426/540 |
| 3,455,838 | 7/1969 | Marotta et al. . |
| 4,283,429 | 8/1981 | Todd et al. ......................... 426/250 |
| 4,285,981 | 8/1981 | Todd et al. ......................... 426/250 |
| 4,315,947 | 2/1982 | Todd et al. ......................... 426/250 |
| 4,316,917 | 2/1982 | Antoshkiw ......................... 426/540 |
| 4,343,823 | 8/1982 | Todd et al. ......................... 426/250 |
| 4,504,499 | 3/1985 | Finnan ............................... 426/250 |
| 4,844,934 | 7/1989 | Lueddecke et al. ................ 426/540 |
| 4,877,635 | 10/1989 | Todd, Jr. ............................ 426/542 |

OTHER PUBLICATIONS

Fennema, O. R., Food Chemistry, 1985, p. 572, Marcel Dekker, Inc., New York.

*Primary Examiner*—Donald E. Czaja
*Assistant Examiner*—Leslie Wood
*Attorney, Agent, or Firm*—Gordon W. Hueschen

[57] ABSTRACT

Superior color-stabilized paprika compositions, which embody certain surface-active agents, especially such compositions having increased resistance to color fading in foods exposed to oxidative stress, wherein an edible solid substrate for the paprika pigment or color may also be present, are disclosed, as well as: a method of stabilizing a paprika pigment against oxidative discoloration; foodstuffs which may encounter oxidative stress and which are colored with a color-stabilized paprika composition of the invention; a method for coloring a foodstuff which may be subjected to oxidative stress by the employment of a color-stabilized paprika composition of the invention; the enhancement of color stabilization characteristics in the compositions and color-stabilizing effectiveness of the methods of the invention by the employment therein of a natural antioxidant; and the still further enhancement of the color-stabilizing characteristics of the compositions and color-stabilizing effectiveness of the methods of the present invention by the further employment therein of an edible oil-soluble ascorbic acid ester.

85 Claims, 1 Drawing Sheet

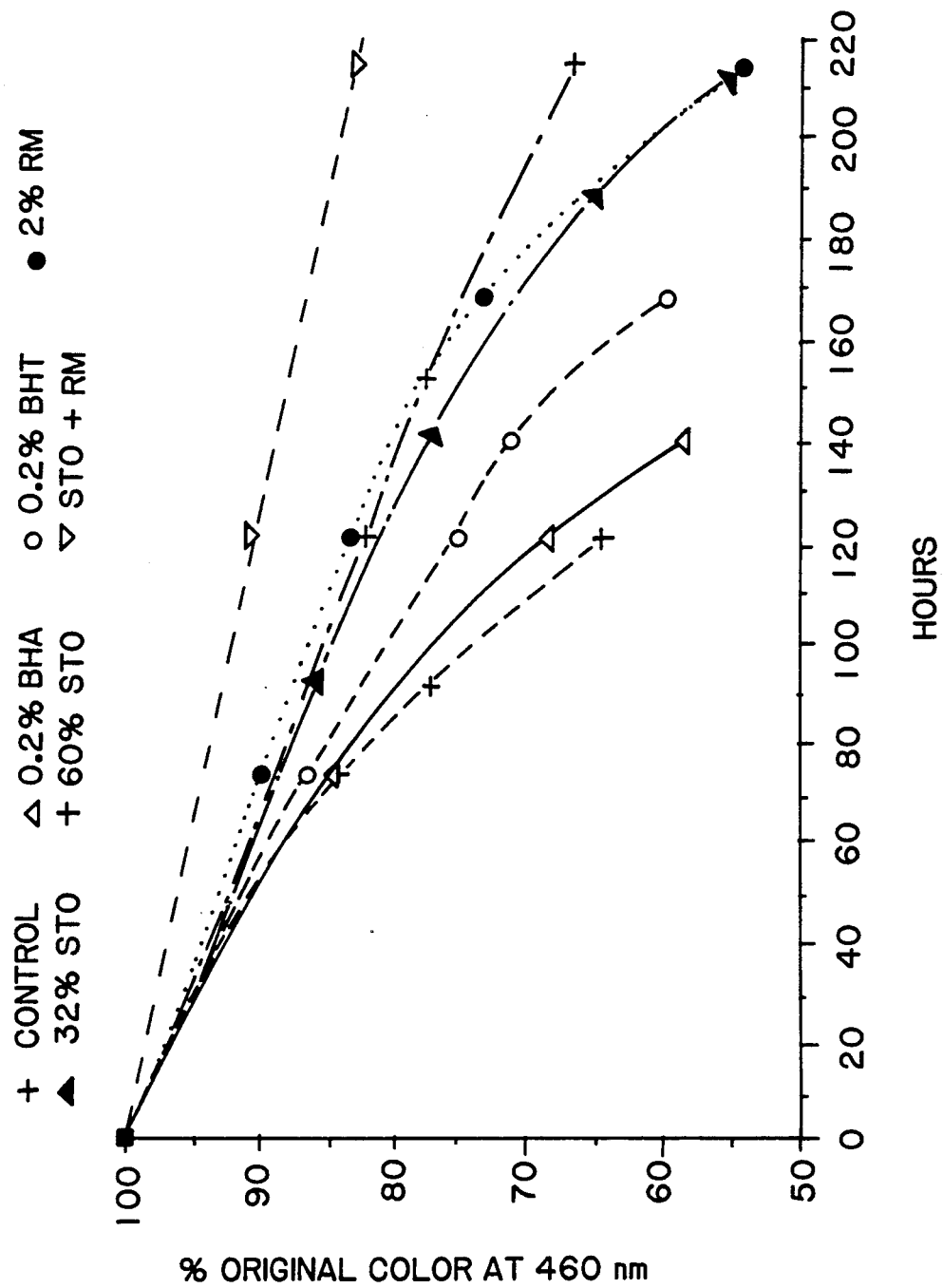

5,059,437

COLOR-STABILIZED PAPRIKA PIGMENT COMPOSITIONS AND FOODS COLORED THEREWITH HAVING INCREASED RESISTANCE TO OXIDATIVE COLOR FADING

BACKGROUND OF THE INVENTION

1. Field of Invention

The stabilization of paprika pigments upon exposure to air with certain digestible surface-active agents, and synergistic combinations of such stabilized pigments with natural antioxidants which further increase their stability.

2. Prior Art

Both ground paprika and its oleoresin are known to lose color rapidly upon exposure to air, due to oxidation of the pigments. Degradation is further accelerated upon exposure to heat and to light. Common antioxidants used in food, such as BHA, BHT, and TBHQ do not markedly inhibit this loss. Therefore, FDA has allowed the use of ethoxyquin as an antioxidant for use in ground paprika at a level of no more than 0.01%. It is the most effective stabilizer of paprika pigments known prior to this invention. Since it may have adverse toxicological properties, its use is not permitted as a direct additive to foods. It is not permitted as an additive to oleoresin paprika.

Encapsulation is another means of avoiding degradation of pigments, and this has been achieved by dissolving the pigment in a solvent, such as chloroform, admixing the solution at a high temperature with an encapsulating agent such as gelatin, and removing the solvent quickly In certain cases, bisulfite is used to prevent degradation, which is ojectionable as a stabilizer. Other systems use thiopropionates as antioxidants, and these are not permitted in foods Yet other systems depend on combinations of polyoxyethylene derivatives combined with BHA and BHT in the presence of substances which are cosolvents for the pigment and polyoxyethylene derivatives to make stable *liquid* combinations, from which the pigment will not crystallize. As shown in this specification, the presence of the polyoxyethylene derivative is highly destabilizing in the presence of oxygen, and the BHA/BHT antioxidants are ineffective.

The prior art shows condimental combinations of seasonings, including oleoresin of paprika, with various emulsifiers to achieve mutual compatibility as well as dispersibility in both oil and water. These systems did not have as their objective the stabilization of the pigments against oxidative or thermal stress and, indeed, suggested deleterious combinations of emulsifiers in terms of the objectives of this specification.

Accordingly, the present art is in great need of non-toxic, natural, effective systems which will preserve the color of paprika and its oleoresin when used in the manufacture of food which is subject to oxidative stress. This invention provides the first such system, which is much more effective than even an ethoxyquin system.

The heart of the invention lies in the totally unexpected effect which certain, but not all, emulsifiers have upon the stability of these pigments. As described hereinafter, these emulsifiers are not antioxidants, and indeed have a slight pro-oxidant effect when added to vegetable oils. Accordingly, the stabilizing effect must be attributed to an unknown mechanism, such as inhibition of electron transfer in the pigment when it quenches singlet oxygen, which then renders it more immune to the attack of oxygen. This, however, is only a hypothesis and not intended to be limiting.

Since the emulsifiers used in the stabilizing systems of this invention are readily digested by the enzymes secreted in the digestive tract, they will not block the electron transfer potential of the pigments after absorption by the body. Therefore, they will not impair their health benefits when a component of the diet. In this respect, no harmful additive, such as ethoxyquin, is introduced into the diet to preserve their effectiveness.

Various combinations of natural antioxidants with the paprika-emulsifier systems achieve stabilities which none of the substances can achieve alone, and indeed the stabilities achievable, for all practical purposes, are greater than a year, as opposed to a month using present art. This opens entirely new uses for paprika pigments.

THE INVENTION

The stability of paprika pigments is markedly increased by admixing them with certain emulsifiers, which emulsifiers are not antioxidants but rather affect the stability of the pigments in some other, unknown, manner. When combined with natural antioxidants, such as those found in rosemary and tea, and tocopherols, as well as a fat-soluble derivative of ascorbic acid, such as ascorbyl palmitate or stearate, a pronounced synergistic effect is found. The resulting stabilized pigments are several orders of magnitude more stable than the unstabilized pigments as found in paprika or its oleoresin, and permit the substitution of these natural pigments for synthetic colors presently used in foods where the paprika pigments are unstable.

The potential benefit to the public nutrition is great, since the synthetic, so called "coal tar" colors are considered to be potentially harmful, whereas the paprika pigments have provitamin A activity and are emerging as potentially-important anticarcinogens.

BRIEF DESCRIPTION OF THE DRAWINGS

Referring now to the drawings for a better understanding of the invention, FIG. 1 is a graph showing the comparative fading rates of 4% weight by weight dispersions of oleoresin paprika at 50%C wherein the ordinate shows the percent of original color at 460 nm retained by the sample and the abscissa shows the time period in hours required for ⅓ of the color to fade, thereby to provide the standard "⅓life", there being a control and six.(6) color-stabilizing compositions in the test, the 32% STO, the 60% STO, and the STO plus RM curves illustrating the effectiveness of compositions of the present invention, their superiority in stabilizing oleoresin paprika against color fading being readily apparent from the graph of FIG. 1.

OBJECTS OF THE INVENTION

One object of the present invention is to provide superior color-stabilized paprika compositions, which embody certain surface-active agents, especially such compositions having increased resistance to color fading in foods exposed to oxidative stress, wherein an edible solid substrate for the paprika pigment or color may also be present. Another object is the provision of a method of stabilizing a paprika pigment against oxidative discoloration. A further object is the provision of foodstuffs which may encounter oxidative stress and which are colored with a superior color-stabilized paprika composition of the invention. An additional object is the provision of a method for coloring a foodstuff which may be subjected to oxidative stress by the employment of a color-stabilized paprika composition of the invention. Still a further object is the enhancement of such color stabilization characteristics in the compositions and such color-stabilizing effectiveness of the methods of the invention by the employment therein of a natural antioxidant, and a still further object is the still further enhancement of the color-stabilizing characteristics of the compositions and color-stabilizing effectiveness of the methods of the present invention by the further employment therein of an edible oil-soluble ascorbic acid ester. Still additional objects will become apparent hereinafter and yet other objects will be apparent to one skilled in the art.

SUMMARY OF THE INVENTION

The present invention, then, comprises the following, inter alia, alone or in combination:

A color-stabilized paprika composition having increased resistance to color fading in foods exposed to oxidative stress consisting essentially of
(A) a nonionic surface-active agent taken from the class consisting of:
  a. mono and di glycerides of fatty acids,
  b. polyglyceride esters of fatty acids,
  c. mono and diglyceride esters further esterified with a dibasic organic acid taken from the class consisting of citric and lactic acids,
  d. acetylated mono and diglyceride esters further esterified with a dibasic organic acid taken from the class consisting of citric and lactic acids,
  e. sorbitan esters of fatty acids, and
  f. propylene glycol estersof fatty acids,
  g. lecithin, and
(B) an oleoresin of paprika,
the proportion of (A) to (B) being at least ten percent (10%) by weight, optionally also comprising an edible solid particulate or pulverulent substrate for the paprika pigment or color; such a
composition wherein the proportion of (A) to (B) is between about 0.1:1 and 1.2:1 by weight; such a
composition comprising also a natural antioxidant taken from the class consisting of:
  a. a Labiatae extract,
  b. tocopherols, and
  c. tea extract; such a
composition comprising also an edible oil-soluble ascorbic acid ester; such a
composition comprising at least two of the antioxidants a., b., and c; also
a method of stabilizing a paprika pigment against oxidative discoloration comprising the step of admixing said pigment with a surface-active agent selected from those set forth as a. through g. in any of the foregoing; such a
method comprising the step of admixing the paprika pigment with a natural antioxidant selected from a Labiatae extract, tocopherols, and tea extract; and
a foodstuff, which may encounter oxidative stress, which is colored with a condimental composition as set forth in any of the foregoing; such a
method of coloring a foodstuff which may be subjected to oxidative stress comprising the step of admixing therewith a color-stabilized paprika composition as set forth in any of the foregoing; and such a
method comprising also the step of admixing the paprika pigment with an edible oil-soluble ascorbic acid ester; such a
method wherein the ascorbic acid ester is selected from ascorbyl palmitate or stearate. Moreover, such
a color-stabilized paprika composition wherein the surface-active agent is a sorbitan poly fatty acid ester or a monoglyceride of a fatty acid. Further, such a
composition wherein the surface-active agent is sorbitan trioleate or comprising also as antioxidant a rosemary extract; such a
method wherein the surface-active agent is sorbitan trioleate or comprising also as antioxidant a Labiatae extract; such a
method wherein the surface-active agent is sorbitan trioleate and comprising also as antioxidant a rosemary or sage extract; such
a foodstuff wherein the surface-active agent is a sorbitan poly fatty acid ester or a monoglyceride of a fatty acid; such a
foodstuff comprising also an antioxidant which is a Labiatae extract, or a tocopherol, or a tea extract, especially a rosemary or sage extract. Further, such a composition wherein the surface-active agent is sorbitan trioleate and comprising also as antioxidant a rosemary extract. Additionally, such
a foodstuff comprising also an antioxidant which is an edible oil-soluble ascorbic acid ester, especially comprising ascorbyl palmitate or stearate. Further, such
a method wherein the method is carried out in the presence of an edible solid particulate substrate for the pigment; and such a method
wherein the surface-active agent is sorbitan trioleate and the antioxidant is a rosemary or sage extract and, optionally,
wherein ascorbyl palmitate or stearate is also admixed with the paprika pigment. Finally,
a paprika composition wherein the paprika pigment has a ⅔ life in excess of 220 hours at a temperature of 50° C. when dispersed on flour salt at a concentration of four percent (4%) by weight and
a paprika composition comprising a surface-active agent and optionally a natural antioxidant, wherein the paprika pigment has a ⅔ life greater than twice that of the paprika alone when dispersed on flour salt at a concentration of four percent (4%) by weight.

Source of Materials

The oleoresins of paprika were of 100,000 to 120,000 color value. Ground paprika was from United States origin.

The rosemary and sage extracts were prepared in accordance with Todd, U.S. Pat. No. 4,778,691, and standardized with standard Rancimat methodology, as described in that patent, to give an antioxidant activity equivalent to that of Herbalox TM, Type 0, which is a standard item of commerce available from Kalsec, Inc., Kalamazoo, Mich., U.S.A.

The emulsifiers were obtained from manufacturers, and are listed by their technical rather than trade names. They did not contain antioxidants.

Tea extract was derived from green tea leaves, and standardized to 16% of the antioxidant activity of the Herbalox TM.

Tocopherols and ascorbyl esters, e.g., palmitate, were food grade and obtained from a commercial manufacturer.

Flour salt was food grade and obtained from a manufacturer which supplies it to seasoning houses for use in making dispersions.

Glossary of Terms

This glossary describes both abbreviations used in the specification and other technical terms and apparatus referred to.

| Abbreviation | Technical Term |
|---|---|
| BHA | butylated hydroxy anisole |
| BHT | butylated hydroxy toluene |
| GMO | glycerol monooleate |
| PG | propylene glycol |
| SBO | soy bean oil |
| STO | sorbitan trioleate |
| SMS | sorbitan monostearate |
| 8-1-0 | octaglycerol monooleate |
| 10-1-CC | decaglycerol mono-capric-caprylate |
| RM | rosemary extract, specifically Herbalox-O TM product of Kalsec, Inc., Kalamazoo, Michigan |

RM Rosemary Extract: The extract used is Herbalox TM, which is a commercial product available from Kalsec, Inc., standardized as to antioxidant activity, and about 20% active antioxidant compounds. It should be recognized, in this connection, that the art does not yet enable one to determine the exact concentration of active antioxidants in the extract, and 20% is merely an approximation based on the degree of dilution of the deodorized rosemary extract with soy oil.

Peroxide Value: This is also a standard test for evaluation of the degree to which an oil has been oxidized.

Paprika: The ground seedless or whole pods of *Capsicum annum*.

Oleoresin Paprika: The solvent extract of paprika, preferably essentially seedless. The extract used in the examples had color values of between about 100,000 and 130,000 by standards of the trade, but lower value oleoresins are also effectively stabilized.

Labiatae Extract: The solvent extract of a Labiatae herb, and preferably rosemary, sage, or thyme, especially rosemary. The preferable form is that described in Todd U.S. Pat. No. 4,877,635, and standardized to an antioxidant strength of about twice that of BHT in soy oil, under the standard Rancimat TM conditions. It is commercially available in the form of Herbalox TM.

Rancimat TM: An instrument which measures the induction time of an oleogenous substrate, usually at 120 degrees Celsius and at 18 liters of air per hour. This is an accepted methodology for determining relative strengths of preparations of antioxidants. The effectiveness is expressed as the induction time of the sample divided by the induction time of the control, as a percent.

⅔ life: This is the time it takes for ⅓ of the color of a sample of paprika or dispersed paprika oleoresin to fade under the conditions of the experiment. It is a highly-reproducible measurement, which is sufficiently accurate to evaluate the relative effectiveness of emulsifiers and synergistic combinations thereof. This technique will assist practitioners of the art to optimize formulations for specific uses.

Synergism: As defined in McGraw-Hill *Dictionary of Scientific and Technical Terms*: "An action where the total effect of two active components is greater than the sum of their individual effects." For example, if one additive increases the ⅔ life by 10 hours, and a second by 20 hours, and the combination of the two by 50 hours, the syngeristic effect is an additional (or plus) 20 hours.

Surface-Active Agent: In the context of this specification, it represents a nonionic surface-active agent taken from the class consisting of:
a. mono and di glycerides of fatty acids,
b. polyglyceride esters of fatty acids,
c. mono and diglyceride esters further esterified with a dibasic organic acid taken from the class consisting of citric and lactic acids,
d. acetylated mono and diglyceride esters further esterified with a dibasic organic acid taken from the class consisting of citric and lactic acids,
e. sorbitan esters of fatty acids,
f. propylene glycol esters of fatty acids, and
g. lecithin and their equivalents.

DETAILED DESCRIPTION OF THE INVENTION

The following Examples are given by way of illustration only and are not to be construed as limiting.

EXAMPLE 1

The selectivity of certain emulsifiers in their stabilization effect upon oleoresin paprika Many emulsifiers are permitted in foods, and certain of them form oil in water emulsions, and others water in oil emulsions. They are not considered to have anti-oxidant properties, and indeed, BHA and BHT are often added to them to prevent oxidation. The emulsifiers obtained for this example were examined for antioxidants using supercritical liquid chromatography, and antioxidants were not found to be present at detectable levels.

Table 1 lists a group of common emulsifiers. It shows their pro-oxidant or anti-oxidant potential in Column 1, and their stabilization potential for oleoresin paprika in Column 2.

The anti-oxidant potential was measured by diluting the emulsifier to a concentration of 2.5% in soy bean oil, and measuring the induction time on the standard Rancimat test at 120 deg. C. Results are reported as the % the dosed sample's induction time is that of the control's. A % less than 100 indicates a pro-oxidant effect in the oil; a % greater than 100 indicates an anti-oxidant effect.

The stability contributed to the oleoresin paprika by the emulsifier was measured by mixing one part of the emulsifier with one part of oleoresin paprika of approximately 100,000 color value. This mixture was dispersed at a level of 4% on flour salt, and placed in measured amounts in 10 ml test tubes in an oven maintained at 50 degrees Celsius. Tubes containing the dispersion were periodically withdrawn, and the time taken for ⅔ of the color to fade was determined. This interval is called the ⅓ life of the sample, since ⅔ of the original color remains. A control sample is prepared by diluting the oleresin with an equal part of soy oil, and plating it at 4% on flour salt. The ratio of the ⅔ life of the test sample to that of the control is a measure of the stabilizing effect of the emulsifier.

Table 1 demonstrates that there is a group of emulsifiers with outstanding stabilizing effects on the oleoresin, but which are prooxidant in oil. It also shows that polysorbate 80 is a slight anti-oxidant in soy oil, but is highly destablizing to oleoresin paprika. On the other hand, sorbitan monostearate is a slight pro-oxidant in soy oil, but highly effective in stabilizing the oleoresin. It will be noted that other pro-oxidant emulsifiers as well as those without antioxidant properties are also highly stabilizing.

The specificity of this stabilizing effect, and its sometimes inverse relationship with the antioxidant properties of the emulsifier, is a surprising result and lies at the heart of this invention.

TABLE 1

The pro/anti-oxidant effect and stabilizing effect of certain emulsifiers.

| Emulsifier | Oil Stability, % of control | Paprika Stability % of control |
|---|---|---|
| Control | 100 | 100 |
| Polysorbate 80 | 105 | 24 |
| Sorbitan monostearate | 92 | 378 |
| Sorbitan trioleate | 96 | 330 |
| Octaglycerol monooleate | 89 | 259 |
| Glycerol monooleate | 98 | 129 |
| Decaglycerol tetraoleate | 92 | 187 |
| Citric acid esters of monoglycerides | 100 | 237 |
| Acetylated monoglycerides | 100 | 236 |

It is clear from this table that the selected group of emulsifiers definitely excludes polysorbate 80, a polyoxyethylene derivative. Other derivatives of polyoxyethylene are equally undesirable in combination with oleoresin paprika. In view of their common use in foods, it is unexpected that this class of emulsifiers is deleterious.

EXAMPLE 2

Single and multiple synergistic effects of emulsifier stabilizers with rosemary extract An unpredictable effect of the stabilizers is their ability to enhance the performance of natural antioxidants, such as those derived from Labiatae, and especially from Rosemary and Sage, in a synergistic manner. A second advantage is the expression of double synergism by combining the emulsifier-rosemary mixture with an additional antioxidant or antioxidants. This example utilizes a standard rosemary extract, Herbalox ®, to demonstrate the synergistic effect.

Table 2-1 shows synergistic combinations of preferred emulsifiers with rosemary, and multiple synergism when ascorbyl palmitate, a fat soluble ester of ascorbic acid, is used. It also shows that polysorbate 80 expresses negative synergism, as well as the destabilizing efect shown in Example 1. This demonstrates the specificity of the emulsifier interaction, for which no explanation is available.

The ½ lives are reported in hours at 50 degrees. Column 1 reports the ½ lives. Column 2 reports the increase over the control. Column 3 shows the ½ life which would be expected if the combinations were not synergistic, and column 4 is the synergistic increase, which is the difference between column 4 and column 3. Column 5 reports the synergistic increase as a per cent of the ½ life of the control.

Oleoresin paprika consisted of 49% of the samples, sorbitan trioleate, when present, 49%, and the remainder was either rosemary extract at a level of 2% or soy bean oil to make the total composition 100%. Dispersions were on flour salt.

The Table clearly demonstrates the remarkable positive synergistic effect of the combination of rosemary and the two preferred emulsifiers shown. In addition to polysorbate 80, propylene glycol, a common diluent in formulations, is shown to be deleterious and should be avoided (propylene glycol is not always considered to be an emulsifier). These positive and negative effects are observed in lesser doses, also.

TABLE 2-1

| | Synergistic Effects of Stabilizing Emulsifier and Rosemary extract. | | | | |
|---|---|---|---|---|---|
| | (1) ½ | (2) | (3) | (4) | (5) |
| | | increase over control | | | |
| Emulsifier | life, hrs | actual | expected | synergy | % synergy |
| Synergism | 127 | 0 | | | |
| Control + rosemary | 243 | 116 | | | |
| Sorbitan trioleate + rosemary | 214 419 | 87 292 | 203 | 89 | 70% |
| Sorbitan stearate + rosemary | 282 457 | 155 330 | 271 | 59 | 46% |
| Polysorbate 80 + rosemary | 12 29 | −115 17 | 116 | −99 | −77% |
| Propylene glycol + rosemary | 121 188 | −6 61 | 116 | −55 | −43% |
| Double synergism Control | 127 | 0 | | | |
| Control + 0.6% ascorbyl palmitate | 209 | 82 | | | |
| Sorbitan trioleate + rosemary | 419 | 292 374 | | | |
| Sorbitan trioleate + 0.6% asc. palmitate + rosemary | 686 | 559 | 374 | 185 | 146% |

It should be noted that emulsifiers other than polysorbates and propylene glycol have negative synergism. Among these are acetylated tartaric acid esters of monoglycerides, and triacetic acid ester of glycerine. Why some emulsifiers should have positive, and others negative, synergistic effects is not known.

An essential concept of this invention is the use of an emulsifier-stabilizer which has a single or double or multiple synergistic effect with the rosemary, sage, other Labiatae, or indeed, with other natural antioxidants, such as tocopherols and test extract.

In addition to ascorbyl palmitate and stearate, other edible oil-soluble esters are also operative for these synergistic color-stabilizing effect, such as ascorbyl oleate and the various oil-soluble ascorbic acid esters disclosed in U.S. Pat Nos. 2,454,747, 2,454,748, and 2,454,749 to Weisblat and Wise.

The same multiple synergistic effect is exhibited by the other stabilizing emulsifiers described in this invention, when combined with other Labiatae extracts such as sage and thyme, and with tocopherols and tea extract.

EXAMPLE 3

Multiple synergistic effects between emulsifiers and rosemary extract.

Because of the great stabilities contributed to oleoresin paprika by these systems, an oven temperature of 65 degrees C. was used in this experiment to shorten the time required. The ⅔ life is approximately one-third to one fifth of that at 50 degrees, depending upon the sample, and the apparent synergistic effect is also reduced. The elevation in temperature expedites evaluation of the many combinations possible.

Column 1 of Table 3-1 reports ⅔ lives for a control and samples dosed with various combinations of sorbitan trioleate (STO), decaglycerol mono-caproate caprylate (10-1-CC), octaglycerol monooleate (8-1-0), and rosemary extract (RM). The increase in ⅔ life is shown in column 2, the synergistic effect in column 3, and the % the synergistic increase is of the ⅔ life of the control in column 4. (For example, STO and RM add 12 and 30 hours individually, but in combination add 48. The synergistic effect is 48-42-6 hours).

All mixtures contained 50% oleoresin paprika. Rosemary, when present, was at 2%. Emulsifiers, singly or in combination, were present at 24%. When the sum was less than 100%, the balance was soy oil.

TABLE 3-1

| | Multiple synergistic effects. | | | | |
|---|---|---|---|---|---|
| Additive | (1) | (2) hours | (3) | (4) % | type of synergism |
| control | 36 | | | | |
| STO | 48 | 12 | | | |
| RM | 66 | 30 | | | |
| STO-RM | 84 | 48 | 6 | 16 | single |
| 10-1-CC | 48 | 12 | | | |
| STO + 10-1-CC | 69 | 33 | 9 | 24 | single |
| STO + 10-1-CC + RM | 101 | 65 | 11 | 31 | double |
| 8-1-0 | 55 | 19 | | | |
| STO + 8-1-0 | 72 | 36 | 5 | 14 | single |
| STO + 8-1-0 + RM | 105 | 69 | 8 | 22 | double |

As mentioned above, the synergistic effects would be substantially greater at the lower temperatures to which the oleoresin would normally be exposed. The technique used in this example will enable the practitioner to take advantage of the multiple synergistic effects which the subject invention describes.

⅔ lives of 100 hours or more, as shown for the two double synergistic combinations, provide indefinite stability to the pigments when dispersed on dextrose or flour, and no prior stabilizing system provides such stability.

EXAMPLE 4. COMPARATIVE STABILIZING EFFECTS OF BHA AND BHT WITH THE PREFERRED STABILIZERS OF THIS SPECIFICATION

To protray the ⅔ life method, as well as to visualize the utility of stabilizing emulsifiers and a synergistic combination with rosemary, the preparations shown in Table 4-1 were made, dispersed on flour salt at 4%, and the ⅔ life at 50 degrees was determined. A plot of the % loss of color over time is portrayed in FIG. 1, which enables visualization of comparative loss rates.

TABLE 4-1

| | Composition of samples shown in FIG. 1, in %. | | | | | |
|---|---|---|---|---|---|---|
| | Oleo. | SBO | BHA | BHT | STO | RM |
| control | 50 | 50 | | | | |
| BHA | 50 | 49.8 | 0.2 | | | |
| BHT | 50 | 49.8 | | 0.2 | | |
| STO | 50 | 18 | | | 32 | |
| | 50 | 0 | | | 50 | |
| RM | 50 | 48 | | | | 2 |
| STO + RM | 50 | 0 | | | 48 | 2 |

It is obvious that the synthetic antioxidants, used at ten times their permitted levels, had an insignificant effect onthe stabilization of the pigments, that the higher dose of STO begins to show its effect over the 32% dose after about 200 hours, and that the synergistic effect of rosemary is so powerful that the ⅔ life has not yet been approached.

Similar curves are obtained at 65 degrees.

The double synergism due to the emulsifier stabilizer is totally unexpected, as well as the inactivity of the synthetic antioxidants BHA and BHT. This is further substantiation of the novelty of this unique system for stabilizing paprika pigments.

Other natural antioxidants, including tocopherols and tea extract, also behave in a synergistic manner together with the emulsifiers and the rosemary, sage, or thyme antioxidants, which are representative of the Labiatae.

EXAMPLE 5

Effectiveness an oleoresin paprika of different inherent stabilities

Oleoresin paprika is made from dried sweet red pepper pods, and thses pods are harvested in the northern hemisphere from Setpember to January, depending upon the weather and rying conditions. Accordingly, the inherent stability of the oleoresin will vary with the parpika cultivar and with the condition of the pods and powder.

This Example compares the effects of identical mixtures of stabilizing emulsifier upon oleoresins of different inherent stabilities. Two oleoresins were diluted with equal parts of sorbitan trioleate, and the ⅔ lives compared with the control diluted with an equal part of soybean oil, all dispersed at a 4% level on flour salt, and held in an oven at 50 degrees C.

It also compares the stability of a saponified oleoresin. Saponification is used to separate the fats from the carotenoids for specialized applications in which the fats are undesirable. It also has the effect of greatly reducing the stability of the pigments, perhaps because ntural antioxidants, present in the oleoresin, are either removed or destroyed in the process. This comparison was at 65 degrees. The saponified control was half oleoresin, half soy oil, and the test sample half oleoresin, half sorbitan trioleate.

|  | ⅔ life | |
|---|---|---|
|  | hours | % of control |
| Control #1 | 97 |  |
| Test #1 | 190 | 196 |
| Control #2 | 121 |  |
| Test #2 | 214 | 176 |
| Sapon. control | 15 |  |
| Sapon. test | 22 | 146 |

This example clearly demonstrates that the preferred emulsifiers are highly effective, by themselves, when combined with different types of paprika oleoresin. The synergistic properties of combinations described in Example 3 are equally applicable to different oleorsin types. This is also true for ground paprika of different inherent stabilities.

EXAMPLE 6

Correlation of ⅔ life with expected stability under normal storage conditions

The technique of evaluating the stability conferred on oleoresin or ground paprika, which utilizes the ⅔ life concept, is new to the art. Its uses and limitations should be described for the benefit of the practitioner.

FIG. 1 shows the rate at which color is lost at 50 degrees. It will be noticed that the rate of degradation has a breaking point, where the color intensity begins to fade rapidly. The ⅔ life is designed to approximate this breaking point.

It is reasonably reproducible, and therefore offers a fine guide in the preparation of oleoresin for particular food systems.

The technique is valuable for predicting the stability of paprika pigments when used on snacks, in a seasoning, in a dressing, a baked good, or other foods which are subject to oxidative stress. Because the stabilities which may be achieved with the synergistic combinations described in this invention are in excess of 600 hours at 50 degrees, a comparison between ambient, 50 degree, and 65 degree ⅔ lives will be useful to one who is confronted with developing a formulation for a given food system. A loss of ⅓ of the color may be considered the outer limit of loss in a food, and this technique may therefor be used by a food technologist in evaluating the specific formulations for use with a specific food.

Table 6-1 shows the ⅔ life of typical ground paprikas as well as dispersions of an oleresin at ambient, 50, and 65 degrees C.

TABLE 6-1

Comparison of ambient, 50, and 65 degree ⅔ lives of ground paprika and unstabilized and stabilized oleoresin dispersed on flour salt.

|  | days, amb. | ⅔ lives, hours, 50 | hours, 65 |
|---|---|---|---|
| ground paprika | 45–60 | 125–160 | 42–50 |
| oleoresin 1 | 29 | 88 | 26 |
| oleoresin 2 | 40 | 121 | 36 |
| oleoresin 2, 50%, STO, 50% |  | 214 | 48 |
| oleoresin 2, 49%, STO 49%, RM 2% |  | 401 | 84 |

It will be noticed that, as a rule of thumb, days can be estimated by multiplying the 50 degree ⅔ life by ⅓, and the 65 deg. ⅔ life by one. However, because the higher the ⅔ life, the more the stability is shortened in relation to temperature, mixtures with ⅔ lives above about 350 at 50 degrees have ambient lives of about half a year, and a year or more on dextrose or flour. Consequently, the above Table will be very useful in guiding the practitioner in the development and optimization of a particular formulation for a specific use.

EXAMPLE 7

The stabilization of ground paprika with selected emulsifiers

The same emulsifiers which stabilize dispersed oleoresin paprika upon exposure to air protect the pigments of ground paprika. In a sense, paprika flesh can also be considered to be an oleoresin dispersed on a carbohydrate substrate. Because it consists of solid particles, the method of application and dispesion of the emulsifier is important. Likewise, the choice of emulsifier may be different. One more easily dispersed in water may be preferred to one less easily dispersed, even though the stabilization and synergistic properties may be less. For example, decaglycerol mono oleate is more easily dispersed in water than sorbitan monostearate, but usually has less stabilizing power. Nevertheless, as dispersed on ground paprika it increases the ⅔ life at 65 degrees by about 50% over the control, and it shows synergistic effects with other antioxidants. If paprika is to be used in the ground form, or stored prior to extraction, incorporation of the stabilizer during the drying operation is preferred, and its effects will carry over into the oleoresin. The use of the ⅔ life concept for evaluating emulsifiers will enable a practitioner of the art to optimize the combinations for the particular situation.

One such optimal combination is amixture of 10% rosemary, 10% tocopherols, and 80% sorbitan mono stearate. The mixture, which is solid when cool, is vigorously homogenized in warm water and simultaneously sprayed onto paprika immediately following drying and grinding, so as to rehydrate the paprika to 8 to 10% from about 4%. The amount of stabilizers added is optimally between 0.2 and 1%, not including water. Other combinations will be found adaptable to various processing conditions using the stabilizers, synergies, and techniques for evaluation described.

Doubling or tripling the ⅔ life with these combinations is readily achieved unless the paprika has been seriously abused prior to incorporation of the stabilizer.

EXAMPLE 8

Determination of optimal dosage of stabilizing emulsifier.

While the emulsifier is effective at any level, it is impractical to under and over-dose. Table 3 shows the effect of increasing the dosage of sorbitan trioleate upon the stability of an oleoresin.

TABLE 3

Dose related stability effects of sorbitan tri oleate in oleoresin paprika dispersed on flour salt, and exposed to air at 50 degrees C.

| Emulsifier, % | ⅔ life hours | ⅔ increase hours | % increase per % emulsifier |
|---|---|---|---|
| 0 | 118 |  |  |
| 8 | 126 | 8 | 1 |
| 16 | 147 | 21 | 1.3 |
| 32 | 182 | 35 | 2.2 |
| 64 | 320 | 138 | 2.2 |

The table shows that a minimal level is required to gain efficiency, and that this is in the range of about 10-20%. Above about 32%, the effect is linear, and the upper limitation depends upon the degree to which the oleoresin can economically be diluted. A range of about 30% to 55% is preferred, but obviously not limiting.

When mixed emulsifiers and synergistic combinations are used, they can be optimized using the technique shown in the preceding examples. For example, a synergistic mixture of rosemary, tocopherols, and a mixed emulsifier of sorbitan monostearate and acetylated monoglycerides may be an optimal mixture for a baked good, where the acetylated monoglycerides may also perform a function of retarding staling. Each mixture can be evaluated by this technique for a particular application by choosing among the emulsifiers expressing stabilizing and synergistic properties.

EXAMPLE 9

Classificaiton of non-ionic emulsifiers (surface active agents) in relation to stabilizing and synergistic effect It is clear from the above examples that many combinations of emulsifiers and antioxidants can be made. Because there are so many food grade emulsifiers available, it will be helpful to one practicing the art to evaluate their desired combinations using the technique shown in the prior Examples. The following classification of emulsifiers may also provide assistance in selection.

For the purposes of this specification, emulsifiers are separated into three classes (1) those exhibiting strong stabilizing and synergistic properties; (2) those exhibiting stabilizing properties but relatively modest synergizing properties; and (3) those which are dsetablizing and/or cause negative synergism. The latter class is specifically excluded from this invention, since it is detrimental to the stabilizing effect of rosemary, tocopherols, and the like, as well as to the stability of the oleoresin dispersion without any added natural antioxidant.

It will occur to the practitioner, as the table is studied, that the classification is independent of the hydrohillipophil balance of the emulsifier. Accordingly, this invention enables the practitioner to design a stabilizing system for paprika pigments which is best adapted to the physical needs of the specific food in which the coloring will be used.

(1) Surface active agents or emulsifiers with strong stabilizing and synergistic properties with natural antioxidants.
sorbitan esters, such as mono and tri oleates and stearates
lactic acid esters of mono and diglycerides (2) Surface active agents or emulsifiers with strong stabilizing and modest synergistic properties:
polyglycerol esters of fatty acids, such as octaglycerol monooleate, decaglycerol capric caprylate, and decaglycerol tetraoleate
mono-diglycerides of fatty acids, such as glycerol mono oleate
acetylated monoglycerides
citric acid esters of mono-diglycerides
lecithin (may cause discoloration to brownish shade and unpleasant aromas)
propylene glycol esters of fatty acids (3) Emulsifiers with destablizing and/or anti-synergistic properties. (The % anti-synergistic effect is shown in combination with rosemary).

|  | % syn |
|---|---|
| tartaric acid esters of mono diglycerides | −97% |
| triacetic acid ester of glycerine | −18% |
| polyoxyethylene derivates, such as polysorbitan mono oleate and stearate. (Exceptionally destabilizing and anti-synergistic). |  −76% |
| propylene glycol | −64% |

Emulsifiers in the firt class are the preferred embodiments of this invention, whereas those in the second class are less preferred, and those in the third class are surprisingly deleterious. It is remarkable that, except for the polyoxyethylene derivatives, there is no structural relationship between the emulsifiers and the classes into which they fall.

Emulsifiers falling within the first two classes are within the scope of this invention, and the practitioner should recognize that even though it may appear desirable to include an emulsifier of the third class in a composition, because of its superior emulsification properties, it will detract from the stabilizing emulsifiers and synergisms, and every effort to avoid inclusion of even incidental amounts should be made.

EXAMPLE 10

Examples of use of the stabilized paprika oleoresin in foods

A. Stability of the synergistic paprika-rosemary-emulsifer combination when used on a breading.

A standard breading mix was prepared using about 5% flour salt, 50% unbleached wheat flour, 25% bleached wheat flour, 8% corn meal, and lesser amounts of baking soda, dried whey and skim milk powder, anticaking agents such as silicon dioxide and monocalcium phosphate, and these ingredients were blended together.

The control sample was prepared by blending in 2% of an oleoresin of paprika, a second control had 2% oleoresin paprika containing rosemary extract, and the test sample had 4% of a mixture blended into it, the mixture consisting of 48% oleoresin paprika, 2% of the standard rosemary extract, and 50% of the sorbitan trioleate.

The blends were placed in an ovent at 350 degrees Fahrenheit, and obseved. This duplicated the exposure of breadings in commercial baking applications. These breadings were observed for rate of color loss.

The control breading had faded from a red-orange to tan in 15 minutes, the breading made with paprika containing rosemary only was partially faded, and the test breading retained color after 30 minutes, and was just beginning to fade after 40 minutes. This demonstrates the utiliyt of the stabilized paprika in a typical baking application.

The breadings were also exposed to fluorescent light at room temperature for five days, to simulate the stability which would be achieved on a display counter in a grocery store. The control breading had faded, the breading stabilized with rosemary was beginning to turn white at the edges, but the breading containing rosemary and sorbitan trioleate retained its bright color, without fading to white at the edges. This clearly demonstrates the efficacy of the invention as applied to breading mixtures.

B. Improved stability of baked goods

A prepared white cake flour mix was purchased at the grocery store. To 200 g of this mix was added a 50:50 mixture of oleoresin paprika and soybean oil at a level of 0.04%, which gave an orange red shade. This was the control asmple. The test sample was made from the same flour, and to it was added a mixture of 48% oleoresin paprika, 2% of the standard rosemary extract, and 50% sorbitan trioleate. This gave a mix of the same shade and intensity as the control.

Water was added to each mixture, and the batter was baked. Upon completion of baking, the test sample was marginally more colored than the control. Upon standing five days in foil pack, the control sample had begun to fade, wheras the test sample had not. Furthermore, upon exposure to light, as would be the case on a grocery shelf, the control sample had become light, whereas the test sample retained its red orange color. The same difference was observed with samples retained in a test oven at 50 degrees Centigrade overnight.

This demonstrates the efficacy of the invention as applied to baked goods, and particularly as applied to baked goods when exposed to light on store shelves.

C. Stability of synergistic mixtures to heat.

Oleoresin paprika of 100,000 color value was diluted with soy oil to give an absorbance of 0.35 at 460 nm in a 1 cm light path when read directly in a spectrophotometer. To a second ample of the same oleoresin, 4% by weight of the standard rosemary extract was added, and this was combined with an equal weight of sorbitan trioleate. This mixture was diluted with soy oil to provide an absorbance of 0.35. Accordingly, both oils had the same color intensity, and simulate the so-called "red oil" used in frying or popping corn.

These oils were placed in glass tubes, which were inserted into a metal block maintained at 130 degrees Centigrade.

Absorbance was again measured at the end of 1½ hours of heating, and the % loss at 460 nm was determined. In addition, to determine if the xanthophylls had selectively faded as compared to beta carotene, the ratio of the absorbance at 470/460 was compared. If xanthophylls had selectively faded, it would be lower in the sample which had lost the most xanthophylls.

The % loss and ratios were as follows:

|  | % loss 460 nm | ratio 470/460 nm |
|---|---|---|
| control | 32.5 | .032 |
| test | 6.2 | .039 |

Accordingly, it is shown that the rosemary, sage, or thyme and emulsifier combination has an unexpected and dramatic effect upon the heat stability of the paprika oleoresin. Furthermore, the relative rate of degradation of the xanthophylls and the beta carotene is approximately the same for both samples, showing that the protection is equally provided to the non-xoygenated (beta carotene) and oxygenated carotenoids (capsanthin, etc.) present. The improved stability of the paprika oleoresin makes it feasible to use it in frying applications.

D. Stabilization of the color of a salad dressing

A French dressing was made using 1.1% dry mustard, 0.32% xanthan gum, 2.4% salt, 12% sugar, 22% water, 22% white distilled vinegar, and the balance soybean oil. A control was made by adding oleoresin paprika only at a level of 0.065%. A second control was made by adding oleoresin paprika containing 4% rosemary. The test dressing contained the same amount of paprika combined with an equal part of sorbitan trioleate and 4% of its weight of the rosemary, to give all dressings the same level of paprika coloring.

After 26 days in light, to simulate store shelf exposure, the control had developed a brownish cast and had slightly faded, the control with rosemary had not developed the brownish cast but was slightly faded. The test sample retained its original bright color at the same visual intensity, demonstrating the power of the synergistic combination of rosemary and sorbitan ester.

This demonstrates the efficacy of the invention in oil-based emulsion systems under conditions in which the paprika carotenoids are exposed to light and to the air enhanced in the emulsion.

Since the hydrophil-lipohil balance of the stablizing emulsifier is not critical for achieving stability, the technologist can choose that emulsifier for combination with paprika which will not react unfavorably with the other constituents of the dressing, which are, as is well known, varies considerably in practice.

It is thus seen that the present invention provides a color-stablized paprika composition which embodies certain surface-active agents having increased resistance to color fading in foods exposed to oxidative stress, as well as a method of stabilizing a paprika pigment against oxidative discoloration, foodstuffs which may encounter oxidative stress colored with a composition of the invention, and a method of coloring a foodstuff with such a color-stabilized paprika composition of the invention. The method of stabilizing the paprika pigment is advantageously carried out in the presence of an edible solid substrate for the paprika pigment. Synergistic effects are obtained by the incorporation of a natural antioxidant in such compositions and methods and the colorstability of the compositions and the effectiveness of the methods is further enhanced by inclusion of an edible oil-soluble ascorbic acid ester therein. All of the foregoing provide long-awaited solutions to previously-existing color instability and fading problems not adequately solved by the prior art.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. A color-stabilized paprika composition having increased resistance to color fading in foods exposed to oxidative stress consisting essentially of
(A) a nonionic surface-active agent taken from the class consisting of:
   a. mono and di glycerides of fatty acids,
   b. polyglyceride esters of fatty acids,
   c. mono and diglyceride esters further esterified with a dibasic organic acid taken from the class consisting of citric and lactic acids,
   d. acetylated mono and diglyceride esters further esterified with a dibasic organic acid taken from the class consisting of citric and lactic acids,
   e. sorbitan esters of fatty acids, and f. propylene glycol esters of fatty acids,
g. lecithin, and
(B) an oleoresin of paprika,
the proportion of (A) to (B) being at least ten percent (10%) by weight, optionally also comprising an edible solid particulate substrate for the paprika pigment or color.

2. A composition of claim 1, wherein the proportion of (A) to (B) is between about 0.1:1 and 1.2:1 by weight.

3. A composition of claim 1 or claim 2, comprising also a natural antioxidant taken from the class consisting of:
   a. a Labiatae extract,
   b. tocopherols, and
   c. tea extract.

4. A composition of claim 3 comprising also an edible oil-soluble ascorbic acid ester.

5. A composition of claim 3 or claim 4 comprising at least two of the antioxidants a., b., and c.

6. The method of stabilizing a paprika pigment against oxidative discoloration comprising the step of admixing said pigment with a surface-active agent selected from those set forth as a. through g. in claim 1.

7. The method of claim 6 also comprising the step of admixing the paprika pigment with a natural antioxidant selected from a Labiatae extract, tocopherols, and tea extract.

8. A foodstuff, which may encounter oxidative stress, which is colored with a condimental composition of claim 1.

9. A foodstuff, which may encounter oxidative stress, which is colored with a condimental composition of claim 2.

10. A foodstuff, which may encounter oxidative stress, which is colored with a condimental composition of claim 3.

11. A foodstuff, which may encounter oxidative stress, which is colored with a condimental composition of claim 4.

12. A foodstuff, which may encounter oxidative stress, which is colored with a condimental composition of claim 5.

13. The method of coloring a foodstuff which may be subjected to oxidative stress comprising the step of admixing therewith a color-stabilized paprika composition of claim 1.

14. The method of coloring a foodstuff which may be subjected to oxidative stress comprising the step of admixing therewith a color-stabilized paprika composition of claim 2.

15. The method of coloring a foodstuff which may be subjected to oxidative stress comprising the step of admixing therewith a color-stabilized paprika composition of claim 3.

16. The method of coloring a foodstuff which may be subjected to oxidative stress comprising the step of admixing therewith a color-stabilized paprika composition of claim 4.

17. The method of coloring a foodstuff which may be subjected to oxidative stress comprising the step of admixing therewith a color-stabilized paprika composition of claim 5.

18. The method of claim 7 comprising also the step of admixing the paprika pigment with an edible oil-soluble ascorbic acid ester.

19. The method of claim 7 comprising also the step of admixing the paprika pigment with an edible oil-soluble ascorbic acid ester selected from ascorbyl palmitate or stearate.

20. A color-stabilized paprika composition of claim 1 wherein the surface-active agent is a mono or di glyceride of a fatty acid.

21. A color-stabilized paprika composition of claim 1 wherein the surface-active agent is a polyglyceride ester of a fatty acid.

22. A color-stabilized paprika composition of claim 1 wherein the surface-active agent is a mono or diglyceride ester further esterified with a dibasic organic acid taken from the class consisting of citric and lactic acids.

23. A color-stabilized paprika composition of claim 1 wherein the surface-active agent is an acetylated mono or diglyceride ester further esterified with a dibasic organic acid taken from the class consisting of citric and lactic acids.

24. A color-stabilized paprika composition of claim 1 wherein the surface-active agent is a sorbitan ester of a fatty acid.

25. A color-stabilized paprika composition of claim 1 wherein the surface-active agent is a propylene glycol ester of a fatty acid.

26. A color-stabilized paprika composition of claim 1 wherein the surface-active agent is a sorbitan poly fatty acid ester.

27. A color-stabilized paprika composition of claim 1 wherein the surface-active agent is a monoglyceride of a fatty acid.

28. A composition of claim 3 wherein the antioxidant is a Labiatae extract.

29. A composition of claim 3 wherein antioxidant is a tocopherol.

30. A composition of claim 3 wherein the antioxidant is a tea extract.

31. A composition of claim 3 wherein the antioxidant is a rosemary or sage extract.

32. A method of claim 6 wherein the surface-active agent is a mono or di glyceride of a fatty acid.

33. A method of claim 6 wherein the surface-active agent is a polyglyceride ester of a fatty acid.

34. A method of claim 6 wherein the surface-active agent is a mono or diglyceride ester further esterified with a dibasic organic acid taken from the class consisting of citric and lactic acids.

35. A method of claim 6 wherein the surface-active agent is an acetylated mono or diglyceride ester further esterified with a dibasic organic acid taken from the class consisting of citric and lactic acids.

36. A method of claim 6 wherein the surface-active agent is a sorbitan ester of a fatty acid.

37. A method of claim 6 wherein the surface-active agent is a propylene glycol ester of a fatty acid.

38. A method of claim 6 wherein the surface-active agent is a sorbitan poly fatty acid ester.

39. A method of claim 6 wherein the surface-active agent is a monoglyceride of a fatty acid.

40. A method of claim 7 wherein the antioxidant is a Labiatae extract.

41. A method of claim 7 wherein the antioxidant is a tocopherol.

42. A method of claim 7 wherein the antioxidant is a tea extract.

43. A method of claim 7 wherein the antioxidant is a rosemary or sage extract.

44. A method of claim 13 wherein the surface-active agent is a mono or di glyceride of a fatty acid.

45. A method of claim 13 wherein the surface-active agent is a polyglyceride ester of a fatty acid.

46. A method of claim 13 wherein the surface-active agent is a mono or diglyceride ester further esterified with a dibasic organic acid taken from the class consisting of citric and lactic acids.

47. A method of claim 13 wherein the surface-active agent is an acetylated mono or diglyceride ester further esterified with a dibasic organic acid taken from the class consisting of citric and lactic acids.

48. A method of claim 13 wherein the surface-active agent is a sorbitan ester of a fatty acid.

49. A method of claim 13 wherein the surface-active agent is a propylene glycol ester of a fatty acid.

50. A method of claim 13 wherein the surface-active agent is a sorbitan poly fatty acid ester.

51. A method of claim 13 wherein the surface-active agent is a monoglyceride of a fatty acid.

52. A composition of claim 1 wherein the surfaceactive agent is sorbitan trioleate.

53. A composition of claim 1 comprising also as antioxidant a rosemary extract.

54. A method of claim 6 wherein the surface-active agent is sorbitan trioleate.

55. A method of claim 6 comprising also as antioxidant a Labiatae extract.

56. A method of claim 55 wherein the surface-active agent is sorbitan trioleate.

57. method of claim 56 comprising also as antioxidant a rosemary or sage extract.

58. A foodstuff of claim 8 wherein the surface-active agent is a mono or di glyceride of a fatty acid.

59. A foodstuff of claim 8 wherein the surface-active agent is a polyglyceride ester of a fatty acid.

60. A foodstuff of claim 8 wherein the surface-active agent is a mono or diglyceride ester further esterified with a dibasic organic acid taken from the class consisting of citric and lactic acids.

61. A foodstuff of claim 8 wherein the surface-active agent is an acetylated mono or diglyceride ester further esterified with a dibasic organic acid taken from the class consisting of citric and lactic acids.

62. A foodstuff of claim 8 wherein the surface-active agent is a sorbitan ester of a fatty acid.

63. A foodstuff of claim 8 wherein the surface-active agent is a propylene glycol ester of a fatty acid.

64. A foodstuff of claim 8 wherein the surface-active agent is a sorbitan poly fatty acid ester.

65. A foodstuff of claim 8 wherein the surface-active agent is a monoglyceride of a fatty acid.

66. A foodstuff of claim 65 comprising also an antioxidant which is a Labiatae extract.

67. A foodstuff of claim 65 comprising also an antioxidant which is a tocopherol.

68. A foodstuff of claim 65 comprising also an antioxidant which is a tea extract.

69. A foodstuff of claim 65 comprising also an antioxidant which is a rosemary or sage extract.

70. A foodstuff of claim 8 wherein the surfaceactive agent is sorbitan trioleate.

71. A foodstuff of claim 8 comprising also as antioxidant a rosemary extract.

72. A method of claim 13 wherein the composition comprises the surface-active agent sorbitan trioleate.

73. A method of claim 13 wherein the composition comprises also as antioxidant a rosemary extract.

74. A foodstuff of claim 10 comprising also an antioxidant which is an edible oil-soluble ascorbic acid ester.

75. A method of claim 15 comprising also an antioxidant which is ascorbyl palmitate or stearate.

76. A method of claim 6 wherein the method is carried out in the presence of an edible solid particulate substrate for the paprika pigment.

77. A method of claim 7 wherein the method is carried out in the presence of an edible solid particulate substrate for the paprika pigment.

78. A method of claim 18 wherein the method is carried out in the presence of an edible solid particulate substrate for the paprika pigment.

79. A method of claim 19 wherein the method is carried out in the presence of an edible solid particulate for the paprika pigment.

80. A method of claim 76 wherein the surface-active agent is sorbitan trioleate.

81. A method of claim 77 wherein the antioxidant is a rosemary or sage extract.

82. A method of claim 77 wherein the surface-active agent is sorbitan trioleate and the antioxidant is a rosemary or sage extract.

83. A method of claim 82 wherein ascorbyl palmitate or stearate is also admixed with the paprika pigment.

84. A paprika composition wherein the paprika pigment has a ⅔ life in excess of 220 hours at a temperature of 50° C. when dispersed on flour salt at a concentration of four percent (4%) by weight.

85. A paprika composition consisting essentially of a surface-active agent selected from a.-g. in claim 1 and optionally a natural antioxidant, wherein the paprika pigment has a ⅔ life greater than twice that of the paprika alone when dispersed on flour salt at a concentration of four percent (4%) by weight.

* * * * *

UNITED STATES PATENT AND TRADEMARK OFFICE
CERTIFICATE OF CORRECTION

PATENT NO. : 5,059,437

DATED : Oct. 22, 1991

INVENTOR(S) : Paul H. Todd, Jr.

It is certified that error appears in the above-identified patent and that said Letters Patent is hereby corrected as shown below:

```
Column 1, line 33; "quickly In" should read -- quickly.  In --.
Column 1, line 36; "foods Yet" should read -- foods.  Yet --.
Column 3, line 35; "estersof" should read -- esters of --.
Column 4, line 55; "Rancimat methodology," should read
    -- Rancimat ™methodology, --.
Column 6, line 57; "2/3" should read -- 1/3 --.
Column 6, line 59; "1/3" should read -- 2/3 --.
Column 7, approximately line 56; move "ous." to line 32.
Column 8, line 68; "test" should read -- tea --.
Column 9, line 3; "effect," should read -- effects, --.
Column 10, approximately line 6; "protray" should read --portray--.
Column 10, approximately line 27; "onthe" should read --on the--.
Column 10, line 44; "an" should read -- on --.
Column 10, line 48; "thses" should read -- these --.
Column 10, line 50; "rying" should read -- drying --.
Column 10, line 66; "ntural" should read -- natural --.
Column 12, line 35; "amixture" should read -- a mixture --.
Column 13, line 22; pluralize "effect" and insert a
    period -- . -- thereafter.
Column 13, line 36; "dsetabilizing" should read --destabilizing--.
Column 13, line 44; "hydrohil-" should read --hydrophil- --.
Column 13, line 52; "oxidants." should read -- oxidants: --.
Column 13, line 60; "capric caprylate," should read
    -- capric-caprylate, --.
Column 14, line 14; "firt" should read -- first --.
Column 14, approximately line 50; "ovent" should read --oven--.
Column 14, line 59; "utiliyt" should read -- utility --.
Column 15, line 8; "asmple" should read -- sample --.
Column 15, approximately line 17; "wheras" should read --whereas--.
Column 15, approximately line 30; "ample" should read --sample--.
Column 15, line 61; "xoygenated" should read --oxygenated--.
Column 16, line 19; "enhanced" should read -- entrained --.
```

UNITED STATES PATENT AND TRADEMARK OFFICE
CERTIFICATE OF CORRECTION

PATENT NO. : 5,059,437

DATED : Oct. 22, 1991

INVENTOR(S) : Paul H. Todd, Jr.

It is certified that error appears in the above-identified patent and that said Letters Patent is hereby corrected as shown below:

Column 16, approximately line 25; "varies" should read --varied--.
Column 16, line 40; "colorstability" should read
    -- color stability --.
Column 18, approximately line 33; "wherein antioxidant" should
    read --wherein the antioxidant--.
Column 19, line 20/21; "surfaceac-tive" should read
    -- surface-active --.
Column 19, line 30; "method" should read -- A method --.
Column 20, line 9; "surfaceactive" should read --surface-active--.
Column 20, line 31; "particulate for" should read
    -- particulate substrate for --.

Signed and Sealed this

Sixteenth Day of March, 1993

Attest:

STEPHEN G. KUNIN

*Attesting Officer*      Acting Commissioner of Patents and Trademarks